Sept. 22, 1931.      H. W. HOPKINS      1,823,941
COAL TRUCK
Filed July 17, 1929      5 Sheets-Sheet 1

Inventor
Harvey W. Hopkins
By
Geo. P. Shoemaker
Attorney

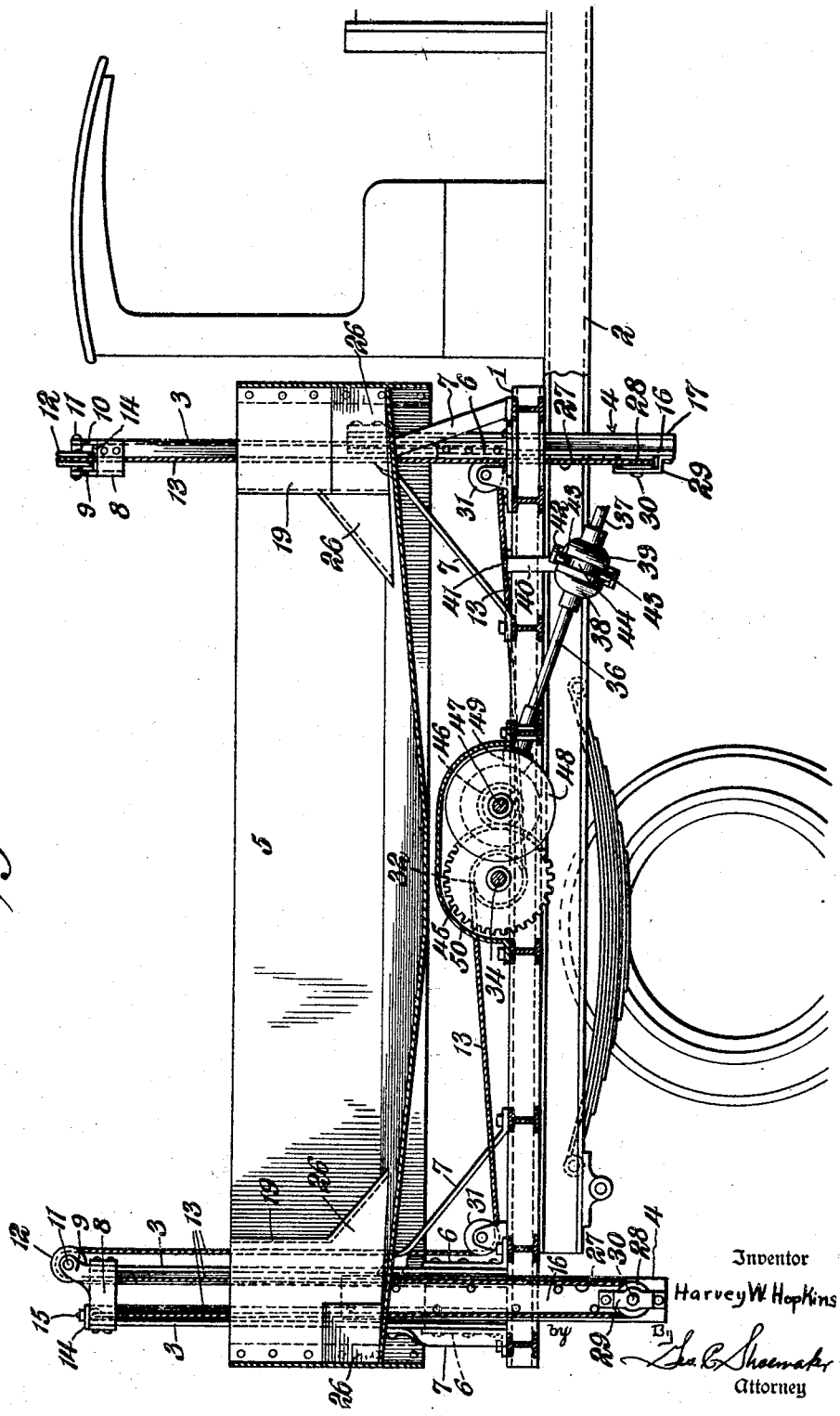

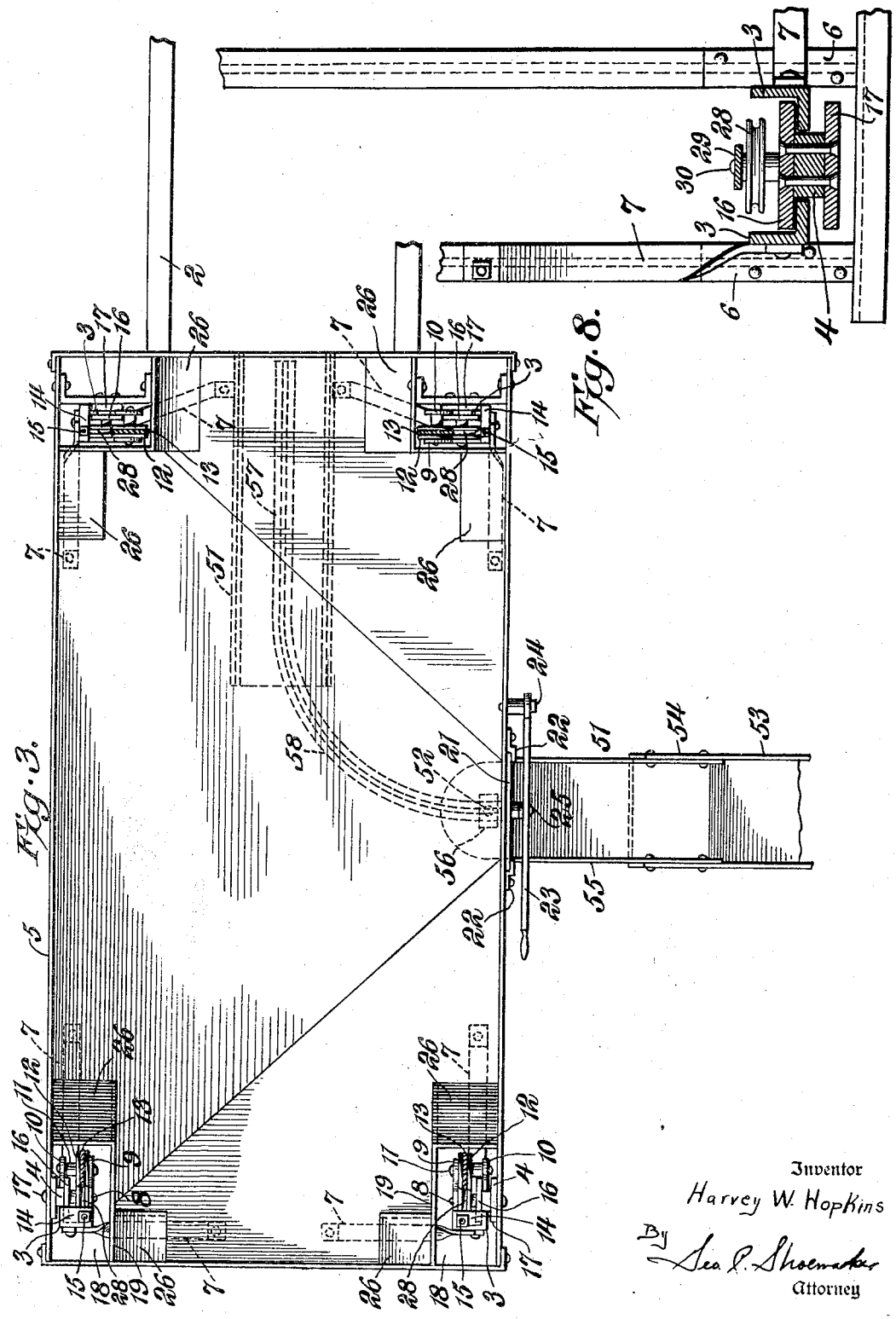

Sept. 22, 1931. H. W. HOPKINS 1,823,941
COAL TRUCK
Filed July 17, 1929 5 Sheets-Sheet 4
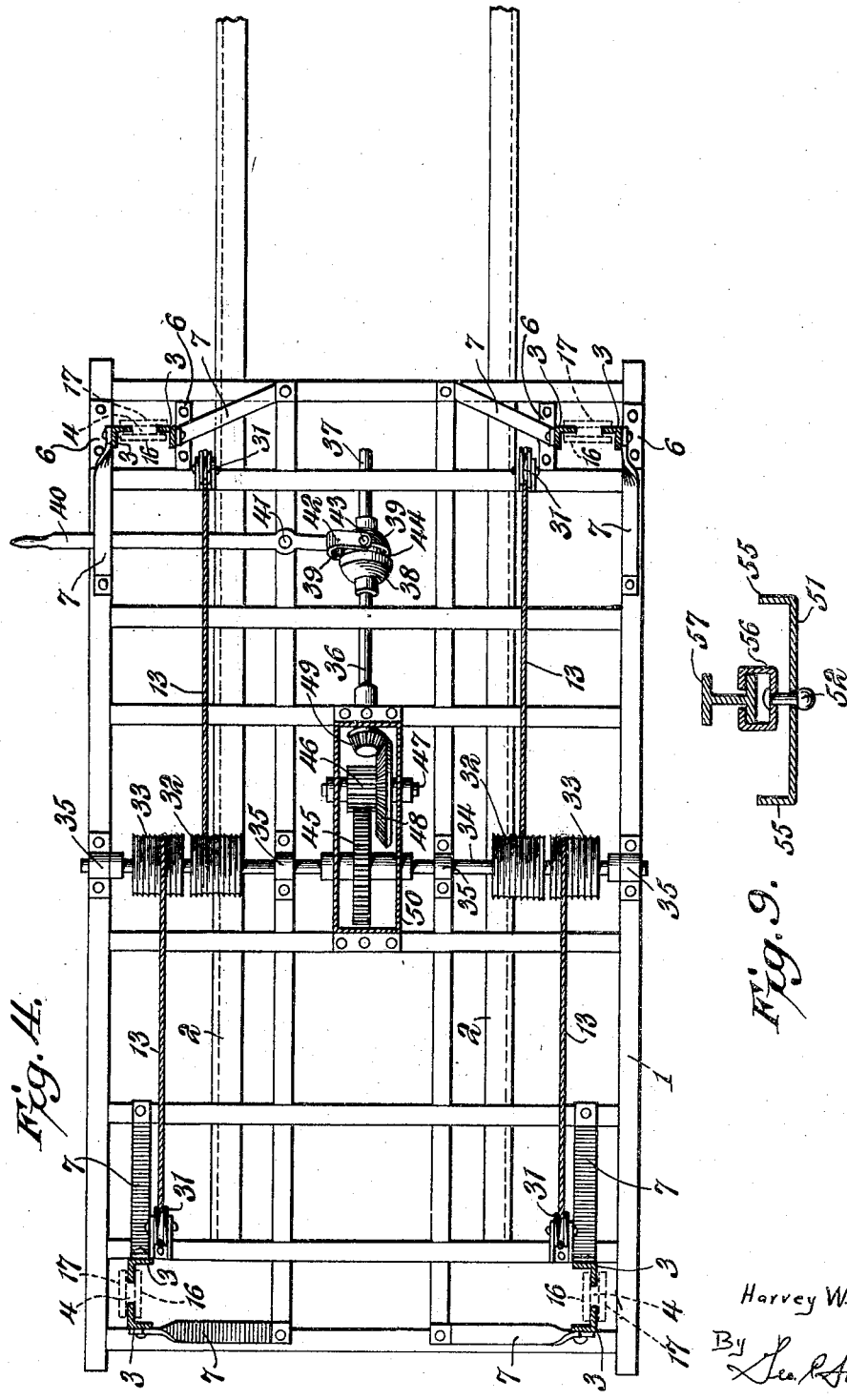
Inventor
Harvey W. Hopkins
By
Attorney Sept. 22, 1931.  H. W. HOPKINS  1,823,941
COAL TRUCK
Filed July 17, 1929   5 Sheets-Sheet 5

Inventor
Harvey W. Hopkin
Attorney

Patented Sept. 22, 1931

1,823,941

UNITED STATES PATENT OFFICE

HARVEY W. HOPKINS, OF BALTIMORE, MARYLAND

COAL TRUCK

Application filed July 17, 1929. Serial No. 379,046.

The invention relates to coal trucks.

The object of the present invention is to improve the construction of coal trucks and to provide a simple, practical and efficient coal truck of strong, durable and comparatively inexpensive construction equipped with a lift body adapted to be raised and lowered by power from the truck motor and having an outlet at the side for discharging the contents of the truck, so that the truck may be readily moved into position for conveniently discharging its contents.

A further object of the invention is to provide a coal truck of this character provided with a pivoted spout or chute adapted, when the truck body is elevated, for discharging its contents, to be arranged beneath a central side outlet and project laterally of the truck beyond the same, so that the contents of the body of the truck will be discharged clear of the truck.

Another object of the invention is to enable the laterally projecting spout or chute to be swung beneath the body so that it will be out of the way when the body is lowered and will not project beyond the truck and interfere with traffic.

With these and other objects in view, the invention consists in the construction and novel combination and arrangement of parts hereinafter described, illustrated in the accompanying drawings, and pointed out in the claims hereto appended, it being understood that various changes in the form, proportion, and minor details of construction, within the scope of the claims, may be resorted to without departing from the spirit of the invention or sacrificing any of the advantages thereof.

In the drawings:

Fig. 2 is a central longitudinal sectional view of the same.

Fig. 3 is a plan view of the same, the pivoted spout or chute being shown extended in full lines and folded in dotted lines.

Fig. 4 is a horizontal sectional view taken substantially on the line 4—4 of Fig. 1.

Fig. 5 is a transverse sectional view on the line 5—5 of Fig. 1.

Fig. 6 is a detail perspective view of the upper portions of the guiding standards of one of the corners of the truck, illustrating the manner of mounting the upper guide pulley.

Fig. 7 is a detail sectional view illustrating the manner of mounting the pulleys of the lifting body.

Fig. 8 is an enlarged detail horizontal sectional view on the line 8—8 of Fig. 1.

Fig. 9 is a detail sectional view illustrating the manner of slidably and pivotally mounting the chute.

Figure 1:
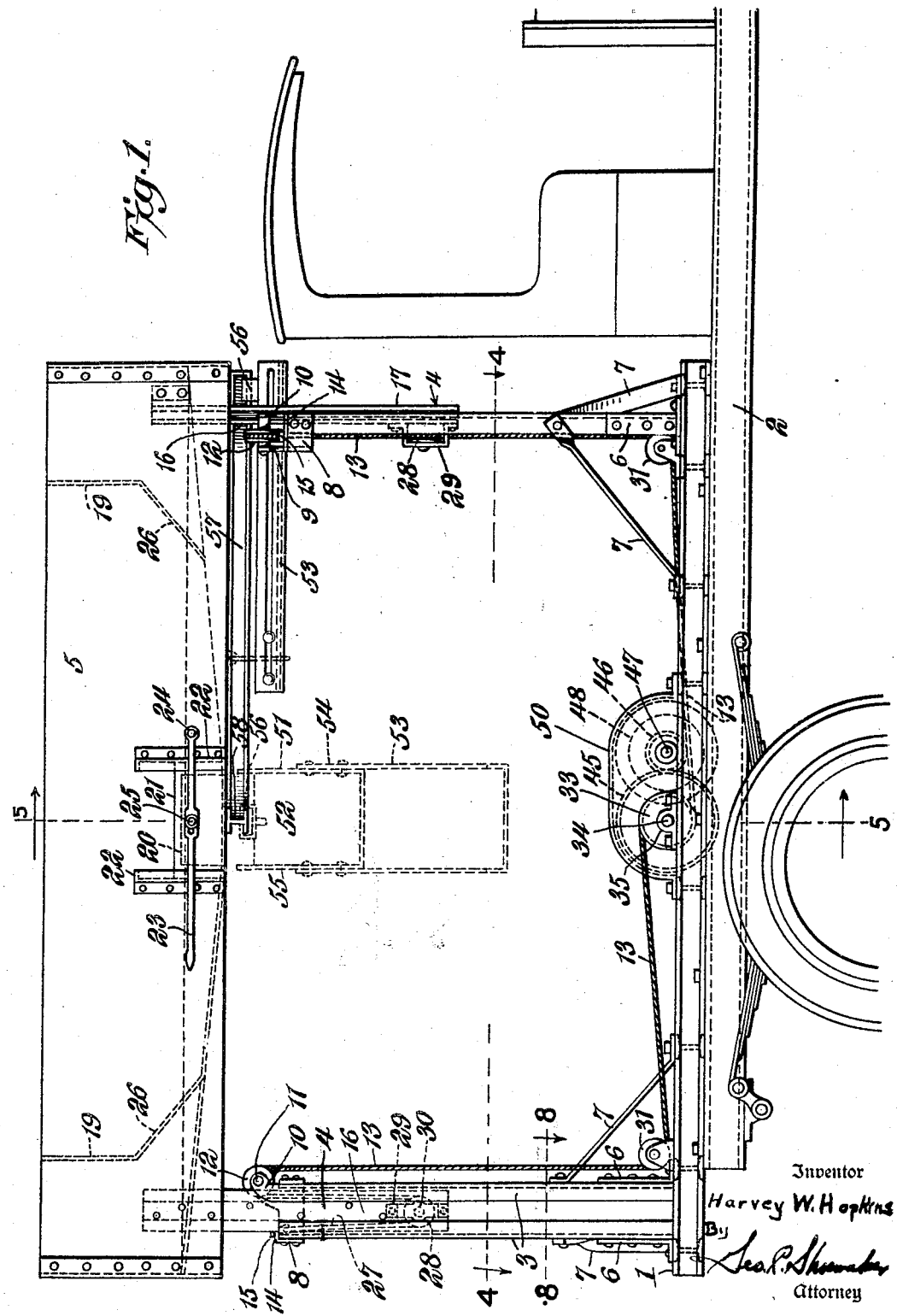
Figure 1 is a side elevation of a coal truck constructed in accordance with this invention, the body being elevated.

In the accompanying drawings, in which is illustrated the preferred embodiment of the invention, 1 designates a horizontal bed frame mounted upon the chassis 2 of a motor truck, as clearly illustrated in Figs. 1 and 2 of the drawings, and preferably composed of side, front and rear frame members and longitudinal and transverse frame members arranged at suitable intervals and connecting the ends of the frame and the sides thereof. The members of the main or bed frame preferably consist of I-beams bolted together and similarly secured to the chassis of the truck, but any other suitable construction may, of course be employed, and the said bed frame extends laterally beyond the chassis, as clearly illustrated in Fig. 4 of the drawings, to provide a supporting frame of the required width.

The bed frame is provided at each of its four corners with a pair of upright guiding standards 3, preferably consisting of angle iron beams and having webs or flanges arranged at right angles to each other and disposed transversely or longitudinally of the frame 1. The longitudinally disposed webs or flanges are spaced apart to provide an intervening space for vertical slides 4 which depend from the corners of a vertically movable or lifting body 5. The vertical guiding standards 3 are secured at their lower ends to the bed frame by bracket members 6, which are L-shaped and have relatively short horizontal arms at their lower ends bolted or otherwise secured upon the bed frame, and the said brackets have relatively long vertical arms which are secured to the transverse flanges of the guiding standards, as clearly shown in Fig. 1 of the drawings. The guiding standards are also supported by inclined braces 7 located at opposite sides of the bed frame and disposed longitudinally of the same and connected with a member of each pair of guiding standards and with the bed frame. The upper ends of the guiding standards of each pair are connected by a bearing bracket 8 of approximately U-shape, composed of spaced sides and a connecting portion, the sides being bolted to the parallel flanges of the standards and the connecting portion being provided with a projecting bearing lug 9 spaced from and arranged in parallelism with a bearing lug 10 formed integral with the other flange of one of the guiding standards. The bearing lugs 9 and 10 receive a horizontal shaft or spindle 11 of an upper guide pulley 12 which receives one of the four cables 13 of the raising and lowering mechanism of the coal truck. The bearing bracket 8, which is approximately U-shaped, is arranged horizontally and receives the upper ends of the said guiding standards between its sides, and it is provided with a top plate or flange 14 arranged upon the upper end of one of the guiding standards for supporting an eye-bolt 15 to which one of the cables 13 is secured, as clearly indicated in Fig. 6 of the drawings.

The depending vertical slides which operate in the guides or ways formed by the spaced corner standards are provided at opposite sides of the guiding flanges of the guiding standards with flanges formed by inner and outer plates 16 and 17 bolted or otherwise secured to the slides 4 at opposite sides thereof, as clearly shown in Fig. 8 of the drawings. The plates project beyond the slides 4 and form grooves to receive the guiding flanges of the corner standards. This will permit free vertical movement of the slides and the body, which will be guided in its vertical movement and firmly held against lateral and longitudinal movement when raised and lowered. The upper portions of the slides are suitably secured to the sides of the vertically movable body at the inner faces of the sides, and the said vertically movable body is provided with corner openings 18 formed by corner housings 19 and arranged to receive the vertical guiding standards when the body is lowered, as clearly illustrated in Fig. 2 of the drawings. The body is provided at one side with a discharge opening 20, and it has a vertically slidable gate 21 mounted in vertical guides 22 and operated by a lever 23 for controlling the discharge of the contents of the body. The lever, which is fulcrumed at one end at one side of the discharge opening on a suitable pivot 24, is pivotally connected intermediate of its ends at 25 to the vertically sliding gate, and it is provided at its other end with a grip or handle. The body is of hopper formation and slopes in all directions toward the central side opening 20, and the corner housings 19 have inclined portions 26 formed by sections of the sloping bottom of the body and adapted to provide ample space for the inclined braces 7 when the body is lowered.

The corner cables are looped between the upper guide pulleys 12 and the eye-bolts to form supporting loops 27 to receive pulleys 28 mounted in suitable bearing brackets 29 which are arranged at the lower ends of the depending vertical slides. The shafts or spindles 30 of the pulleys 28 pierce the slides and extend horizontally therefrom and have their projecting portions supported by the said brackets 29. The pulleys are preferably grooved, and the cables which extend downwardly from the eye-bolts 15 to the pulleys 28 pass beneath the latter and then extend upwardly to the upper guide pulleys 12. The cables extend downwardly from the upper guide pulleys 12 to lower guide pulleys 31 and from the lower guide pulleys to drums 32 and 33 arranged in pairs at opposite sides of the bed frame and mounted on a transverse drum shaft 34. The drums 32 and 33 are spirally grooved and the cables which extend from the drums to the corners of the truck are reversely wound on the drums, so that when the drum shaft 34 is rotated in one direction, all the cables will be wound around the drums, and when the drum shaft is rotated in the opposite direction all the cables will be unwound from the drums for raising and lowering the vertically movable body of the truck.

The drum shaft is journaled in suitable bearings 35 of the bed frame, and it is connected by speed reducing gearing with a longitudinally disposed shaft 36 adapted to be clutched from a power shaft 37 designed to be connected with the transmission gearing of the truck in any suitable manner for enabling the hoisting mechanism of the vertically movable body to be operated by the motor of the truck. The power shaft 37 extends longitudinally of the truck, and any suitable form of clutch may be employed.

In the embodiment of the invention illustrated in the accompanying drawings, the clutch is composed of coacting sections 38 and 39. The section 38 is fixed to the shaft 36, and the other clutch section 39 is interlocked with the shaft 37 and is moved into and out of engagement with the clutch section 38 by a lever 40 fulcrumed intermediate its ends at 41 and having a forked inner portion 42 which partially embraces the clutch section 39 and which has suitable projecting pins 43 which operate in an annular groove 44 in the periphery of the clutch section 39 in the usual manner. The shifting lever 40 extends to one side of the truck, the side opposite that having the discharge opening 20, and is adapted to be manually operated to slide the clutch section 39 into and out of engagement with the clutch section 38 for raising and lowering the vertically movable body. The speed reducing gearing, which may be of any desired character, preferably consists of a spur gear wheel 45 mounted on the drum shaft and meshing with a spur pinion 46 arranged on a short transverse shaft 47 and preferably formed integral with a bevel gear wheel 48 which meshes with a bevel pinion 49 fixed to the rear end of the shaft 36. The speed reducing gearing is preferably housed within a suitable casing 50 to protect the gearing from dust and dirt. Power from the truck motor is employed for raising the vertically movable body of the truck, and when the lifted body is to be lowered the shaft 36 may be unclutched from the power shaft and any suitable means employed for controlling the descent of the parts.

The body is provided with a spout or chute 51 pivoted at 52 to the bottom of the body slightly in rear of the opening 20 and adapted to project beyond the side of the body to enable the coal or other contents of the truck to be discharged through the opening 20, and projected beyond it clear of the truck. When the body is empty, the spout or chute is adapted to be swung beneath the body out of the way, as clearly illustrated in Fig. 1 of the drawings.

The chute 51 is preferably composed of two sections, being provided with an outer extensible section 53 which is slidably connected with the inner or main section by suitable flanges 54 which engage over the side walls or flanges 55 of the main section. The pivot 52 is preferably carried by a slide 56 which is mounted on a guide bar 57 consisting of a flanged beam extending longitudinally of the body and suitably secured to the same. The guide bar 57 extends rearwardly from the front end of the body and is provided with a laterally curved rear portion 58 which terminates below and slightly in rear of the central lateral discharge opening of the body. The flanged beam is preferably an I-beam or any equivalent form of guide may, of course, be employed. The slide 56 engages around the laterally extending flanges at the bottom of the guide and is adapted to slide longitudinally thereof to enable the chute 51 to be moved inwardly and then longitudinally of the body so as to be out of the way and in position to rest upon the bed frame when the body is lowered.

What is claimed is:

1. The combination with a motor truck, of vertical standards consisting of angle bars L-shaped in cross section mounted on the truck at the corners thereof and arranged in pairs to form guides, a vertically movable body provided with depending slides slidable between the guiding standards and provided with inner and outer plates spaced apart by the slides and projecting from the opposite edges thereof to form grooves, said grooves receiving the adjacent flanges of the angle bars, guide pulleys arranged at the upper ends of the standards, cables secured at their outer ends at the tops of the said standards and looped within the same and arranged on the said guide pulleys, pulleys carried by the said slides and supported in the said loops, and operating mechanism designed to be actuated by the motor of the truck and connected with the cables for raising the body.

2. The combination with a motor truck, of vertical standards arranged in pairs at the corners of the truck, a bearing bracket connecting the upper ends of the members of each pair of standards, one of the members of each pair of standards and the bearing bracket thereof being provided with spaced bearing lugs, a guide pulley having a spindle mounted in the bearing lugs, cables arranged on the guide pulleys and looped within the spaced standards and secured at one end to the same, operating mechanism connected with the other ends of the cables, and a vertically movable body having depending slides guided between the standards and provided with pulleys supported in the loops of the said cables.

3. The combination with a truck, of vertical standards mounted on the truck at the corners thereof, a vertically movable body of hopper formation provided at one side with a discharge opening and having corner housings forming vertical openings through which pass the guiding standards when the body is lowered, said housings having inclined portions forming tapered enlargements of the openings, inclined braces supporting the standards and adapted to be received within the enlarged portions of the openings of the housings, slides carried by the body and guided by the standards, and means connected with the slides for raising and lowering the body.

4. The combination of a truck provided with a vertically movable body having a lateral discharge opening, a fixed guide mounted upon the body at the bottom thereof and extending longitudinally of the same from the front end of the body and having a laterally curved rear portion extending to a point adjacent the said opening, a slide movable along the guide, and a chute pivoted to and carried by the slide and adapted to be moved to a position beneath the discharge opening.

In testimony whereof I have hereunto set my hand this 17th day of July, 1929.

HARVEY W. HOPKINS.